UNITED STATES PATENT OFFICE 2,077,478

POLYTHIOCYANO ESTERS

Charles S. Hollander, Holmesburg, and Frederick E. Williams, Emlenton, Pa., assignors to Röhm & Haas Company, Philadelphia, Pa.

No Drawing. Application September 27, 1935 Serial No. 42,393

10 Claims. (Cl. 260—99.10)

This invention relates to new organic compounds which are valuable as insecticides, fungicides and repellants for various pests such as flies, moths, animal and plant insects etc. It relates more particularly to organic compounds having a negative group and two or more thiocyano groups attached to carbon atoms which are not adjacent to each other and to the methods of preparing such compounds.

It is known that certain aliphatic and aromatic thiocyano derivatives which also contain a negative group have insecticidal properties. The lower alkyl thiocyanates, such as methyl and ethyl thiocyanates, have a relatively high proportion of the thiocyano group per unit of weight and they are effective as fumigants but their offensive odor, volatility and irritant action render them unsuited as household and contact insecticides, etc. Some of the simple α, β-dithiocyanates, such for example as those obtained by the addition of thiocyanogen to the double bond of an ethylenic compound, have also been described as insecticides.

The present invention has as one of its objects the preparation of polythiocyano organic compounds which contain in addition to the thiocyano groups at least one negative group such as an ether oxygen, a sulfide, sulfoxide, carboxyl, carbonyl etc. group. A second object of this invention is the application of the thiocyano compounds thus produced to the extermination of all kinds of insect pests such as flies, moths, lice, plant pests etc. as well as fungi. For this purpose the polythiocyano compounds described herein may be used in various ways. They may be dissolved in a suitable solvent such as kerosene or other hydrocarbon, the monobutyl and mono-ethyl ethers of ethylene glycol and diethylene glycol, benzene and ethylene dichloride etc. and used as a spray etc. or adsorbed on dry powder and applied by dusting. They are practically insoluble in water but may be readily emulsified with the assistance of suitable emulsifying agents such as soap, sulfonated oils, alkali metal alkyl sulfates such as sodium lauryl sulfate etc. For the preparation of the emulsion the pure compound may be used or it may be first dissolved in an organic solvent and the resulting solution used to prepare the emulsion. In some cases when it is desired to prepare a solution in a hydrocarbon such as kerosene it may be necessary to add a second solvent in order to increase the solubility of the thiocyano compound. In such instances it is advisable to dissolve the thiocyano compound in a solvent, for example the mono-ethyl ether of ethylene glycol, and then to dilute this solution to the desired concentration with the hydrocarbon.

It has been found that by introducing additional thiocyano groups into a given monothiocyano compound which also contains another negative group, the insecticidal power of the new product per unit of weight is much greater than that of the monothiocyano compound. Thus to produce a given effect it requires less of the polythiocyano compound than of the corresponding monothiocyano compound. In this way also any slight injury to foliage arising, for example, from the use of a monothiocyano compound is reduced to a negligible amount by substituting the polythiocyano compound.

These polythiocyano compounds may be produced from the corresponding halogen compound viz: the corresponding chloro, bromo or iodo compound by heating with sodium, potassium, ammonium, calcium or other suitable thiocyanate. If desired, the reaction may be carried out in the presence of a suitable solvent for the halogen compound such as alcohol or acetone and likewise a catalyst such as copper may be used.

The reaction between the di- or polyhalogen compound and the inorganic thiocyanate is preferably carried out in a solvent such as absolute alcohol, acetone or methyl isobutyl ketone at temperatures between 50 and 150° C., preferably 80 to 120° C. The organic halogen compound is dissolved in the solvent and an excess of the solid, anhydrous, inorganic thiocyanate, for example anhydrous sodium thiocyanate, is suspended in the solution. This is then heated to the desired temperature under constant agitation until all of the halogen compound has been converted to the corresponding thiocyano compound. The time and temperature required for substantially complete conversion of the halogen compound into the polythiocyano compound will depend on the nature of the halogen compound. If necessary the reaction may be carried out under pressure, particularly in cases where the temperature required is above the normal boiling point of the solvent or of the halogen compound in case no solvent is used. In some instances, if the temperature is too high or the time of reaction required too long, some of the polythiocyano compound may decompose giving rise to the corresponding disulfide. On the other hand, if the reaction is not carried to completion, the product will contain some monothiocyano-monohalogen compound or even some of the unchanged polyhalogen compound.

The polythiocyano compounds and the di- or trisulfides arising from their decomposition all have high boiling points even at low pressures so that in attempting to purify the former by fractional distillation considerable decomposition may take place. Only a few of the polythiocyano compounds are crystalline. Therefore, the most expedient method of purification is by extraction with a suitable solvent or by fractional precipitation from solution. Suitable liquids for the latter process are ether and petroleum ether. In general, the monochloro-monothiocyano compounds are more soluble and the disulfides less soluble than the corresponding dithiocyanates. The same applies to compounds containing more than two thiocyano groups.

The products of the reaction between the inorganic thiocyanate and the organic halogen compound may be purified by the methods shown in the following examples and their purity may be determined by analysis for halogen, sulfur and nitrogen.

A wide variety of polythiocyano compounds may be made by the general method described above all of which are valuable as insecticides etc., either alone or used together with pyrethrum, derris, cubé, rotenone and other naturally occurring insect poisons.

These compounds may be divided into several classes such as esters of di- or poly-basic acids in which the alcohol radicals contain thiocyano groups, esters of di- or poly-basic acids in which both alcohol and acid radicals contain thiocyano groups, esters of di- or poly-hydric alcohols in which the acid radical contains a thiocyano-group, esters of thiocyano carboxylic acids in which the alcohol radical may also contain a thiocyano group, ethers, acetals, ketones, alcohols, amines, sulfides, sulfoxides, sulfones, etc. The radical carrying the thiocyano group may be aliphatic, aromatic or hydroaromatic.

Some of the polythiocyano compounds suitable for insecticides etc. are given in the following list, but the invention is not limited to these specific examples:

Esters of carboxylic acids containing a thiocyano group in the alcohol radical and/or in the acid radical, Bis($\beta$-thiocyanoethyl) sebacate, bis($\beta$-thiocyanoethyl) succinate, bis($\beta$-thiocyanoethoxyethyl) sebacate, bis($\beta$-thiocyanoethoxyethyl) succinate, $\beta$-thiocyanoethyl-thiocyanoacetate, glyceryl trithiocyanoacetate, diethylene glycol dithiocyanoacetate, ethylene dithiocyanoacetate, bis($\beta$-thiocyanoethyl) phthalate, bis($\beta$-thiocyanoethoxyethyl) phthalate, and other similarly constituted esters.

Acetals such as bis($\beta$-thiocyanoethoxy) methane, $\alpha,\alpha$-bis($\beta$-thiocyanoethoxy) ethane, $\alpha,\alpha$-bis($\beta$-thiocyanoethoxy)-$\beta$-methyl propane, $\alpha,\alpha$-bis($\beta$-thiocyanoethoxy) butane, $\alpha,\alpha$-bis($\beta$-thiocyanoethoxy) heptane, $\alpha,\alpha$-bis($\beta$-thiocyanoethoxy)-$\gamma$-thiocyano propane, $\alpha,\alpha$-bis($\beta$-thiocyanoethoxy) butene-2, bis($\beta$-thiocyano propoxy) methane, $\alpha,\alpha$-bis($\beta$-thiocyano propoxy)-$\beta$-methyl propane, bis($\beta$-thiocyanoethoxy) phenyl methane, $\alpha,\alpha$-bis($\beta$-thiocyanoethoxy ethyl) propane, and other similarly constituted acetals.

These acetals may be considered as derived from an aldehyde by condensing it with an alcohol containing a thiocyano group.

Ethers such as bis($\beta$-thiocyano) ethyl ether, $\alpha,\beta$-bis($\beta$-thiocyanoethoxy-methoxy) ethane, Various other types of polythiocyano compounds as exemplified by bis($\beta$-thiocyanoethyl) sulfoxide, bis-$\beta$-thiocyanoethyl sulfide, 2,3-bis ($\beta$-thiocyanoethoxy) dioxane, $\alpha,\gamma$-di (thiocyano) propanol-2, tris($\beta$-thiocyanoethyl) amine.

The following examples will illustrate the preparation of these types of polythiocyano compounds and their effectiveness as insecticides etc.

*Example 1*

A mixture of 104 g. of bis($\beta$-chloroethoxyethyl) sebacate, 45 g. of anhydrous sodium thiocyanate, 50 g. of methyl isobutyl ketone and 1 g. of copper dust was stirred and heated on a boiling water bath for 48 hours. The mixture was diluted with water and extracted with ether and benzene. The organic layer was dried over calcium chloride, decolorized with activated carbon, filtered and freed from the solvent by distillation. The residue (75 g.) was an oil which gave the following analysis:

| | Per cent |
|---|---|
| Nitrogen | 5.39 |
| Chlorine | 0.48 |
| Sulfur | 13.46 |

This corresponds to 5.9% of monothiocyano-ethoxyethyl-monochloroethoxyethyl sebacate, 85.6% of the bis($\beta$-thiocyanoethoxyethyl) sebacate and 7.3% of a sulfide containing a percentage of sulfur equivalent to that of a disulfide of approximately twice the molecular weight as the chloride used. In subsequent examples this compound will be referred to simply as the disulfide. This dithiocyano compound was made up into an emulsion in the ratio of 1:800 of water with the aid of a suitable emulsifying agent and was sprayed onto leaves which were infested with mealy bugs. After 24 hours 86% of the bugs had been killed and the foliage was uninjured.

*Example 2*

100 g. of bis($\beta$-chloroethoxyethyl) succinate, 58 g. of anhydrous sodium thiocyanate, 50 g. of methyl isobutyl ketone and 1 g. of copper dust were stirred at about 115° C. on an oil bath for 44 hours. The mixture was diluted with water and extracted with ether and petroleum ether. This gave a small amount of an oil which analyzed 7.23% of nitrogen showing that it contained about 94% of the bis($\beta$-thiocyanoethoxy ethyl) succinate. Further extraction of the aqueous emulsion with benzene and chloroform yielded a brown oil which filtered very slowly leaving a resinous residue. On analysis the filtrate showed 6.20% of nitrogen and 0.32% of chlorine corresponding to 81.7% of the desired dithiocyano compound and 3.2% of the monothiocyanoethoxy ethyl-monochloroethoxy ethyl succinate. An emulsion of one part of this dithiocyano compound in 1900 parts of water containing a suitable emulsifying agent was sprayed onto apple foliage infested with aphis (*Anuraphis roseus*). After 24 hours 80.5% of the bugs had been killed and the foliage was uninjured.

*Example 3*

A mixture of 143 g. of $\beta,\beta'$-dichloro-diethyl ether, 240 g. of anhydrous sodium thiocyanate, 140 g. of methyl isobutyl ketone and 3 g. of copper dust was stirred and heated on an oil bath at 120–130° C. for 25 hours. The liquid was decanted and filtered and the residual salt extracted with benzene and chloroform. The solution was freed from the solvent and the residue filtered again. Analysis showed that the dark oil thus obtained contained about 87% of bis($\beta$-thiocyanoethyl) ether.

A sample tested as in Example 1 killed 97% of the mealy bugs in 24 hours without injury to the foliage.

*Example 4*

A mixture of 24.7 g. of bis($\beta$-chloroethoxy-methoxy) ethane, 19 g. of anhydrous sodium thiocyanate and 60 g. of anhydrous acetone was sealed in a bomb tube and heated in an oven at 109–116° C. for 20 hours. The product was extracted with water and ether and the ether layer dried with calcium chloride. This solution was filtered, concentrated and finally heated at a pressure of 25 mm. in an oil bath at 130° C. for 30 minutes. The residue was a dark oil containing about 77% of $\alpha,\beta$-bis($\beta$-thiocyanoethoxy-methoxy) ethane. When tested as shown in Example 1 this dithiocyano compound killed 82% of the mealy bugs without injury to the foliage.

*Example 5*

A mixture of 30 g. of bis($\beta$-chloroethyl) sulfoxide, 30 g. of anhydrous sodium thiocyanate and 300 cc. of 97% ethyl alcohol was refluxed on a water bath for six hours. The alcohol was then distilled off under reduced pressure and the residual oil was filtered free from the salt. The salt was then washed with absolute alcohol. The filtered oil and the alcohol used for washing were combined and treated with decolorizing charcoal, filtered and the alcohol removed by a current of air. The product was practically insoluble in kerosene, ether, benzene and water but quite soluble in absolute methanol from which it was recrystallized giving white crystals melting at about 57.5–58.5° C. Analysis showed that it contained 97% of bis($\beta$-thiocyanoethyl) sulfoxide. One part of this dithiocyano compound was made up into an emulsion with 2000 parts of water and tested as shown in Example 2. 80% of the aphis was killed without injury to the foliage.

*Example 6*

A mixture of 25 g. of 2,3-bis($\beta$-chloroethoxy) dioxane, 40 g. of anhydrous sodium thiocyanate, 1 g. of copper powder and 125 cc. of absolute methanol was refluxed and stirred for 22 hours. The reaction mixture was diluted with water and extracted with benzene. The benzene solution was dried with anhydrous magnesium sulfate and concentrated under diminished pressure. The residue was extracted five times with 40 cc. of petroleum ether (B. P. 60–100° C.) and then twice with ether following which it was crystallized first from absolute alcohol and then from benzene. The white crystals obtained melted at about 89.5–90.5° C. and contained practically pure 2,3-bis($\beta$-thiocyanoethoxy) dioxane. A 2% solution of this dithiocyano compound in the monobutyl ether of ethylene glycol was used in the fly-test method devised by Peet-Grady (Jour. Econ. Ent. 21, 598–625 (1928)). After ten minutes 95% of the flies were paralyzed and lying on the floor and of these 81% were dead after 24 hours. When made up into a 1:800 aqueous emulsion as described in Example 1 it killed 90% of mealy bugs without injury to the foliage.

*Example 7*

A mixture of 52 g. of bis($\beta$-bromoethoxy) methane, 46 g. of anhydrous sodium thiocyanate and 50 cc. of absolute alcohol was heated at 75–80° C. for 24 hours. The product was extracted with benzene and washed with water. The benzene was distilled off and the residue dissolved in ether from which it was fractionally precipitated with petroleum ether. This gave an oil which was shown by analysis to contain about 87% of bis($\beta$-thiocyanoethoxy) methane. When used in an aqueous emulsion as described in Example 1 this dithiocyano compound killed 93% of the mealy bugs without injury to the foliage.

*Example 8*

A mixture of 29 g. of $\alpha,\alpha$-bis($\beta$-chloroethoxy)-ethane, 23 g. of anhydrous sodium thiocyanate and 80 cc. of absolute alcohol was stirred and refluxed for 10 hours and then purified as shown in Example 7. The product was then distilled giving 12.5 g. of a fraction boiling at 160–185° C./4 mm. which contained about 70% of $\alpha,\alpha$-bis-($\beta$-thiocyanoethoxy)ethane. A 2% solution of the product in a mixture of kerosene and ethylene dichloride was tested according to the Peet-Grady method against flies. After 10 minutes all of the flies were paralyzed and lying on the floor and of these 76.5% were dead at the end of 24 hours. An aqueous emulsion of this dithiocyano compound in 800 parts of water as described in Example 1 killed 94% of mealy bugs without injury to the foliage.

*Example 9*

A mixture of 76 g. of $\alpha,\alpha$-bis($\beta$-bromoethoxy)-$\beta$-methyl propane, 57 g. of anhydrous sodium thiocyanate, 50 cc. of absolute alcohol and 1 g. of copper dust was treated as described in Example 7. The resulting product contained about 88% of $\alpha,\alpha$-bis($\beta$-thiocyanoethoxy)-$\beta$-methyl propane. When used in an aqueous emulsion of 1:800 as shown in Example 1 it killed 92% of mealy bugs without injury to the foliage.

*Example 10*

A mixture of 85 g. of $\alpha,\alpha$-bis($\beta$-bromoethoxy)-butane, 64 g. of anhydrous sodium thiocyanate, 50 cc. of absolute alcohol and 2 g. of copper dust was stirred and heated at 55° C. for 24 hours and and then purified as shown in Example 7. The purified product contained about 93% of $\alpha,\alpha$-bis($\beta$-thiocyanoethoxy)butane. When used in 1:800 aqueous emulsion as shown in Example 1 it killed 94% of the mealy bugs without injury to the foliage.

*Example 11*

A mixture of 51 g. of $\alpha,\alpha$-bis($\beta$-chloroethoxy)-heptane, 36 g. of anhydrous sodium thiocyanate and 100 cc. of re-distilled amyl alcohol was stirred and refluxed for 10 hours at 130° C. The mixture was filtered and the solvent removed by distillation under diminished pressure. The residue was extracted with petroleum ether leaving a viscous oil which contained about 85% of $\alpha,\alpha$-bis($\beta$-thiocyanoethoxy)heptane. A 1:1700 aqueous emulsion of this dithiocyano compound when tested as shown in Example 2 killed about 80% of aphis without injury to the foliage.

*Example 12*

A mixture of 23.5 g. of $\alpha,\alpha$-bis($\beta$-chloroethoxy)-$\gamma$-chloropropane, 32 g. of anhydrous sodium thiocyanate, 40 cc. of absolute alcohol and 1 g. of copper dust was heated at 105–110° C. for 24 hours and extracted with benzene. The solution was washed with water and the solvent removed. The oil was extracted with ether leaving a residue which on analysis showed that it contained 80–82% of α,α-bis(β-thiocyanoethoxy)-γ-thiocyano propane. 1:600 aqueous emulsion of this trithiocyano compound when tested as shown in Example 2 killed 70% of the aphis without injury to the foliage.

*Example 13*

A mixture of 6 g. of α,α-bis(β-chloroethoxy)-butene-2, 8 g. of anhydrous sodium thiocyanate, 5 cc. of absolute alcohol and 0.1 g. of copper dust was heated at 100° C. of 24 hours. This was diluted with water and extracted with benzene and concentrated. Extraction of the residue with petroleum ether gave an oil containing about 77% of α,α-bis(β-thiocyanoethoxy)butene-2. This dithiocyano compound was made up into a 1:800 aqueous emulsion and sprayed onto plants which were badly infested with aphis. After 24 hours over 95% of the aphis was killed and the foliage was not injured.

*Example 14*

A mixture of 39 g. of α,γ-dichloropropanol-2, 72 g. of anhydrous sodium thiocyanate and 100 cc. of absolute alcohol was heated on a water bath for 17 hours. The mixture was extracted with benzene to remove the unreacted chloride and then washed several times with water. The residue was amorphous, tan solid which intumesced at 100–110° without darkening. The product contained about 77% of α,γ-dithiocyanopropanol-2. This solid dithiocyano compound was mixed with 100 parts of air-floated clay and the resulting dust applied to apple foliage infested with aphis. After 24 hours 63% of the aphis was killed without injury to the foliage.

*Example 15*

A mixture of 37 g. of bis(γ-chloropropoxy)-methane, 43 g. of anhydrous sodium thiocyanate, 2 g. of copper dust and 40 cc. of absolute alcohol was stirred at 105° C. for 24 hours. The product was isolated in the usual way and purified by precipitation from acetone with petroleum ether. The product contained approximately 84% of bis(γ-thiocyanopropoxy)methane. A 1:1700 aqueous emulsion of this product when tested as shown in Example 2 killed 82% of aphis without injury to the foliage.

*Example 16*

A mixture of 24 g. of α,α-bis(γ-chloropropoxy)-β-methyl propane, 24 g. of anhydrous sodium thiocyanate, 1 g. of copper powder and 25 cc. of absolute alcohol was stirred at 105° C. for 24 hours. The product was isolated in the usual manner and purified by precipitation from an ether solution by the addition of petroleum ether. The product contained approximately 86% of α,α-bis(γ-thiocyanopropoxy)-β-methyl propane. A 1:1700 aqueous emulsion of this dithiocyano compound when tested as shown in Example 2 killed 80% of the aphis without injury to the foliage.

*Example 17*

A mixture of 25 g. of bis(β-chloroethoxy) phenyl methane, 24 g. of anhydrous sodium thiocyanate and 150 cc. of acetone was refluxed for 66 hours. The organic material was isolated and extracted four times with petroleum ether. The residue contained about 70% of bis(β-thiocyanoethoxy) phenyl methane. A 1:2000 aqueous emulsion of the product when tested as shown in Example 2 killed about 84% of aphis without injury to the foliage.

*Example 18*

A mixture of 20.5 g. of tris(β-chloroethyl) amine hydrochloride, 48 g. of anhydrous sodium thiocyanate and 100 cc. of acetone was stirred and heated at 60° C. for 15 minutes. The organic material was extracted with chloroform, concentrated and extracted with water and then with acetone. The residue was a light yellow powder containing approximately 76% of tris(β-thiocyanoethyl) amine. One part of this product was made into a dust with 100 parts of air-floated clay as shown in Example 15. When this dust was applied to apple foliage infested with aphis, it killed 83% of the aphis after 36 hours without injury to the foliage.

*Example 19*

A mixture of 19 g. of bis(β-chloroethyl) sulfide, 28 g. of anhydrous sodium thiocyanate and 150 cc. of acetone was heated 60 C. for 45 hours. The organic product was extracted with benzene, washed with dilute sodium carbonate solution, dried and concentrated. The residue was extracted several times with petroleum ether leaving an oil which contained approximately 87% of bis(β-thiocyanoethyl) sulfide. When tested as shown in Example 2, a 1:2000 aqueous emulsion of this product killed about 82% of aphis without injury to the foliage.

Those compounds herein disclosed that can be considered as derived from esters of carboxylic acids are the subject matter of an application Serial No. 42,454 filed September 27, 1935.

We claim:

1. Compounds containing at least two thiocyano groups attached to different carbon atoms of a chain, said chain containing from four to eighteen carbon atoms and at least one atom of the group consisting of oxygen, sulfur and nitrogen positioned intermediate said thiocyano groups.

2. Compounds containing at least two thiocyano groups attached to different carbon atoms of a chain, said chain containing at least four carbon atoms and at least two oxygen atoms, two of said oxygen atoms being attached to the same carbon atom which is intermediate two thiocyano groups, said carbon atom having an alkyl substituent.

3. Compounds containing at least two thiocyano groups attached to different carbon atoms of a chain, said chain containing at least four carbon atoms and at least two oxygen atoms, two of said oxygen atoms being attached to the same carbon atom which is intermediate two thiocyano groups, said carbon atom having an alkyl substituent containing from one to six carbon atoms.

4. Acetals in which each of the alcoholic radicals contains a thiocyano group.

5. Acetals in which each of the alcoholic radicals contains a thiocyano group and an ether oxygen atom.

6. An insecticidal composition having as its active ingredient a thiocyano compound which contains at least two thiocyano groups attached to different carbon atoms of a chain, said chain containing at least four carbon atoms and at least one atom of the group consisting of oxygen, sulfur and nitrogen positioned intermediate said thiocyano groups.

7. An insecticidal composition having as its active ingredient a thiocyano compound which contains at least two thiocyano groups attached to different carbon atoms of a chain, said chain containing at least four carbon atoms and at least two oxygen atoms, two of said oxygen atoms being attached to the same carbon atom which is intermediate two thiocyano groups.

8. An insecticidal composition having as its active ingredient a thiocyano compound which contains three thiocyano groups attached to different carbon atoms of a chain, said chain containing at least four carbon atoms and at least two oxygen atoms, two of said oxygen atoms being attached to the same carbon atom which is intermediate two thiocyano groups, said carbon atom having an alkyl substituent which carries a thiocyano group.

9. An insecticidal composition having as its active ingredient an acetal derived from an aldehyde having from one to seven carbon atoms and an alcohol which contains a thiocyano group.

10. An insecticidal composition having as its active ingredient an acetal derived from an aldehyde having from one to seven carbon atoms and an alcohol which contains a thiocyano group and an ether oxygen atom.

CHARLES S. HOLLANDER.
FREDERICK E. WILLIAMS.